United States Patent [19]

Geisthoff

[11] Patent Number: 4,641,990
[45] Date of Patent: Feb. 10, 1987

[54] DRIVELINE COUPLING WITH SAFETY INTERLOCK MECHANISM LATCHABLE IN THE OPEN POSITION

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 842,544

[22] Filed: Mar. 21, 1986

[30] Foreign Application Priority Data

Mar. 29, 1985 [DE] Fed. Rep. of Germany ....... 3511577

[51] Int. Cl.⁴ .............................................. F16B 7/00
[52] U.S. Cl. .................................. 403/317; 403/322; 403/328
[58] Field of Search ............... 403/322, 316, 317, 325, 403/321, 328, 327

[56] References Cited

U.S. PATENT DOCUMENTS

| 4,402,626 | 9/1983 | Recker | 403/328 |
| 4,464,077 | 8/1984 | Herchenbach et al. | 403/316 |
| 4,579,476 | 4/1986 | Post | 403/328 X |

FOREIGN PATENT DOCUMENTS 3345732  2/1985  Fed. Rep. of Germany .

Primary Examiner—Andrew V. Kundrat
Attorney, Agent, or Firm—Toren, McGeady, Stanger, Goldberg & Kiel

[57] ABSTRACT

A coupling assembly including a lock latchable in the unlocked position particularly for connecting a universal shaft with a power takeoff shaft in agricultural implements, wherein a coupling sleeve on the universal shaft may be slipped into torque transmitting engagement onto a power takeoff shaft and held in the locked position by locking members engaging within an annular groove of the power takeoff shaft. A lock ring holds the locking members in the locked position and when it is desired to release the coupling, a gripping sleeve is moved so as to disengage the lock ring from the locking members to enable disengagement of the locking members from the annular groove in the power takeoff shaft. A resilient spring washer having an axial slit is provided with a first and a second conical face on opposed sides thereof, with the first conical face engaging a first complementary conical face on the gripping sleeve so as to drive the spring washer against a second complementary conical face on the coupling sleeve to radially expand the spring washer when the assembly is to be brought into the unlocked position by movement of the gripping sleeve. The spring washer is formed with an inner cylindrical bore which engages a cylindrical seating face on the coupling sleeve to maintain the coupling assembly latched in the unlocked position.

4 Claims, 4 Drawing Figures

DRIVELINE COUPLING WITH SAFETY INTERLOCK MECHANISM LATCHABLE IN THE OPEN POSITION

The present invention is directed generally to a driveline coupling assembly and more particularly to a coupling mechanism having a safety interlock for connecting two shafts in torque transmitting engagement, particularly a universal joint shaft driving an agricultural machine with the power takeoff shaft of a tractor.

Devices of the type to which the present invention relates usually consist of a coupling sleeve having an axial bore into which a power takeoff shaft may be placed in torque transmitting engagement. Radial openings are provided in the coupling sleeve and locking members are guided in the openings, which, when the coupling is in the locked position, will be embraced or encircled by a locking ring biased by a spring force with a gripping sleeve connected with the locking ring.

In the prior art, there is known from DE-PS No. 33 45 732 a driveline coupling which is latchable in the open or unlocked position having a lock ring which is biased in the locking direction by a spring force and which is connected with a gripping sleeve. The coupling disclosed has the disadvantage that it is constructed to be relatively long in the axial direction and, as a result, the coupling sleeve must be designed with an appropriate length in order to be able to receive the safety lock coupling.

In certain cases, there exists a necessity, particularly where small tractors and small agricultural implements and machines are involved, to operate with coupling sleeves which are extremely short and which operate to connect the power takeoff shaft with the universal shaft. In such cases, only a very small axial structural length is available at the coupling sleeve for a driveline coupling which operates to be latchable in the unlocked position.

The present invention is therefore directed toward creating a driveline coupling having a safety interlock which is latchable in the unlocked position and which, at the same time, has an extremely short axial structural length.

SUMMARY OF THE INVENTION

Briefly, the present invention may be described as a coupling assembly which may be latched in the unlocked position comprising a coupling sleeve within which a power takeoff shaft may be received in torque transmitting engagement with locking members arranged in radial apertures in the coupling sleeve operating to engage within an annular groove formed in the power takeoff shaft to lock the power takeoff shaft in the torque transmitting position. A locking ring engages about the locking members to hold the assembly in the locked position and a gripping sleeve is provided connected with the locking ring.

In accordance with the invention, a resilient spring washer having an axial slit formed therein which enables the spring washer to expand and contract radially is provided with a first conical face arranged in mating engagement with a first complementary conical face formed on the gripping sleeve and with the second conical face arranged in mating engagement with a second complementary conical face formed on the coupling sleeve. The resilient spring washer is formed with a cylindrical inner bore which is adapted to seat on a cylindrical seating face formed on the coupling sleeve. In the operation of the device, when the assembly is in the locked position, the gripping sleeve is moved so that the first complementary conical face engages the first conical face of the spring washer and drives the spring washer against the second complementary conical face so that the spring washer expands and becomes seated on the cylindrical seating face of the coupling sleeve, whereby the assembly is latched in the open position.

When a power takeoff shaft is inserted into the axial bore of the coupling sleeve, the locking members which are arranged in the radial apertures of the coupling sleeve are pushed radially outwardly and engage the resilient spring washer to move it back to its original position, whereupon the locking members may become engaged in the annular groove within the power takeoff shaft with the assembly being returned to the locking position.

The locking members, in the area of the cylindrical seating face, are equipped with a control face which forms an angle $\alpha$ with a longitudinal axis of the coupling assembly, which angle opens toward a direction opposite to the direction of engagement of the coupling sleeve on the power takeoff shaft.

A pin is arranged at the coupling sleeve so as to extend into the slit of the resilient spring washer and to be maintained therein during the entire length of axial travel of the spring washer in order thereby to prevent angular relative movement of the washer.

With the present invention, there is formed a driveline coupling having a safety lock with the advantage that the slit spring washer holds the lock ring in the locked position by means of its radially acting spring force and that the spring washer, at the same time, assumes the retaining function in the arrested or latched open position until it is released by the action of the control faces of the locking members because of the sliding in of a power takeoff shaft into the coupling sleeve.

In an advantageous embodiment of the invention, the slit resilient washer is provided on both sides with an outwardly widening inner cone. This measure increases the axial travel of the grippling sleeve connected with the lock ring wherefrom there results an optimum short construction in the axial direction.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

DESCRIPTION OF THE PREFERRED EMBODIMENT

Figure 1:
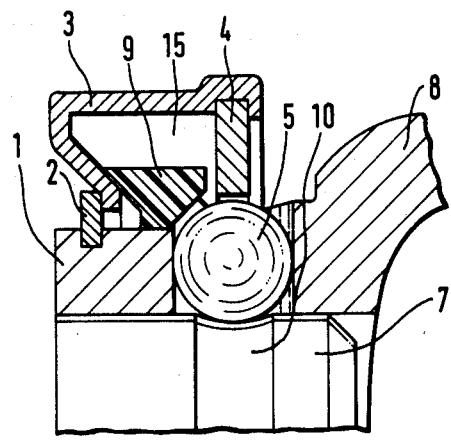
FIG. 1 is a partial sectional view taken through a coupling assembly in accordance with the invention showing the assembly in the engaged or locked position.

Referring now to the drawings, it will be seen that the present invention is basically comprised of a coupling sleeve 1 having an axial throughbore 20 extending therethrough within which a power takeoff shaft 7 may be placed in torque transmitting engagement with the coupling sleeve 1. The power takeoff shaft 7 is formed with an annular groove 10 into which locking members 5 engage when the assembly is in the locked position depicted in FIG. 1.

It should be seen that, in order to place the assembly in the locked position of FIG. 1, the coupling sleeve may be moved into engagement with the power takeoff shaft 7 by movement in a direction leftwardly as seen in FIG. 1. This would be considered the slip-on direction of the coupling sleeve with the sleeve 1 being adapted to be removed from engagement with the power takeoff shaft 7 by movement toward the right as seen in FIG. 1.

In FIG. 1, the coupling sleeve 1 is shown in a partial sectional view and on the side facing away from the slip-on direction, it extends in the form of an articulated fork 8 which may constitute a part of the universal joint (not shown). The coupling sleeve 1 is equipped with radial throughbores 6 within which the locking members 5 are guided. At the point where the throughbores 6 meet the axial throughbore 20 of the coupling sleeve 1, the bores 6 are equipped with projections which point radially inwardly in order to prevent the locking members 5 from dropping out of the bores 6.

An axial safety ring 2 is arranged at the slip-in side of the coupling sleeve 1 which serves as a stop for a gripping sleeve 3 which is connected with a lock ring 4.

Figure 3:
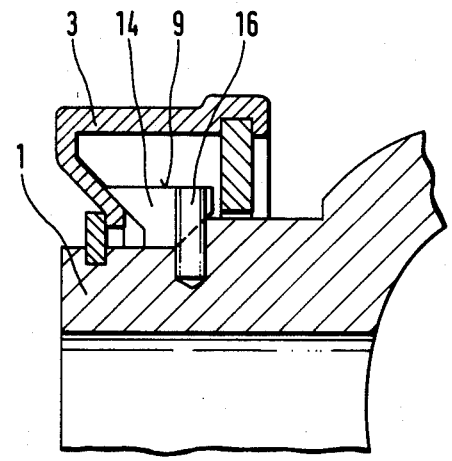
FIG. 3 is a sectional view taken along a plane of the assembly extending through a slit in the spring washer in order to depict an antirotation safety feature of the device.

The invention particularly comprises a slit spring washer 9 which is arranged within a free space 15 formed between the lock ring 4 and the gripping sleeve 3. The slit spring washer 9 is formed of resilient material and, as best seen in FIG. 3, an axial slit 14 is provided which enables the washer 9 to expand and contract radially.

Figure 4:
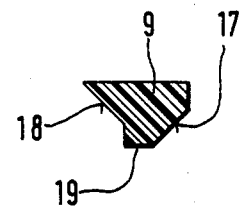
FIG. 4 is a cross-sectional view taken through the split spring washer of the invention.

As will be seen from FIG. 4, the slit ring washer 9 is provided with a conical or slanted surface 18 on one side thereof and with a second conical surface 17 on the opposite side thereof.

Additionally, the washer 9 is provided with a cylindrical inner bore 19.

In the locking position illustrated in FIG. 1, the slit spring washer 9 is biased radially inwardly and is supported on the side thereof having the conical surface 17 on a complementary conical surface 12 formed on the coupling sleeve. On the opposite side, the spring washer 9 is supported by engagement of the conical surface 18 on a complementary conical surface formed on the gripping sleeve 3. Thus, a force component directed axially in the direction of the axial safety ring 2 is thus generated to act on the gripping sleeve 3 through which the lock ring 4 embracing the locking members 5 holds the locking members 5 in the annular groove 10 of the power takeoff shaft 7, whereby the coupling sleeve 1 is locked upon the power takeoff shaft 7 for torque transmitting engagement therebetween.

In order to effect release of the coupling assembly from the locking position shown in FIG. 1, the gripping sleeve 3 is displaced in a direction counter to the slip-on direction and the locking ring 4 is thus removed from the effective range of the locking members 5, thereby enabling the locking members 5 to become disengaged from the annular groove 10 so that the coupling sleeve 1 may be slipped off the power takeoff shaft 1. As a result of the movement of the gripping sleeve 3 in a direction counter to the slip-on direction or to the right, as seen in FIG. 1, the slit spring washer 9 is caused to move onto the conical surface 12 of the coupling sleeve 1 and, as a result of sliding engagement between the complementary conical surface 12 and the conical surface 17 of the washer 9, the washer 9 is radially expanded and moved to the position shown in FIG. 2 where the inner bore 19 is engaged upon a cylindrical seating face 13 provided on the coupling sleeve 1 adjacent the complementary conical surface 12.

After the coupling sleeve 1 is pulled from the power takeoff shaft 7, the gripping sleeve 3 can be displaced a sufficient distance counter to the slip-on direction of the coupling sleeve 1, i.e., to the right as shown in FIG. 1, so as to urge the spring washer 9 to seat with its cylindrical inner bore 19 upon the cylindrical seating face 13 at the coupling sleeve 1. When this occurs, the arrested or latched/open position of the coupling assembly with the safety lock is established as shown in FIG. 2.

When the coupling assembly of the invention is to be returned to the locked position, the coupling sleeve 1 is moved toward the slip-on direction upon the power takeoff shaft 7 and the portions of the shaft 7 will engage the locking members 5, which, as will be seen from the drawings, comprise spherical balls, so that the members 5 will be displaced radially outwardly prior to alignment of the annular groove 10 with the members 5. As a result of this outward displacement, the balls 5 will act upon the slit spring washer 9 in such a manner that the washer 9 is displaced from the cylindrical seat 13 and so that it will move onto the complementary conical surface 12.

Figure 2:
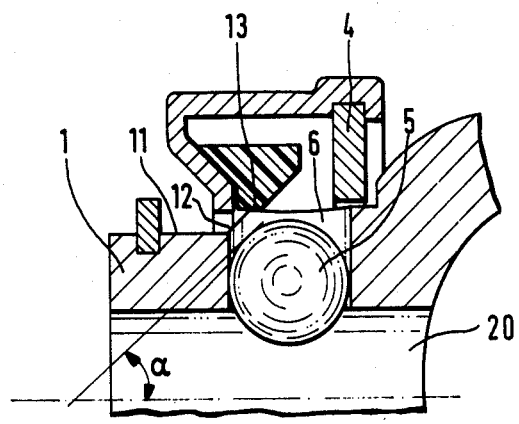
FIG. 2 is a sectional view showing the assembly of FIG. 1 in the arrested or latched open position.

As will be seen from FIG. 2, the locking members 5 are formed in the area of the cylindrical seat 13 with a control face which forms an angle $\alpha$ with the longitudinal axis of the coupling assembly, with the angle $\alpha$ widening in a direction counter to the slip-on direction, as clearly seen from FIG. 2.

After the locking members 5 engage into the annular groove 10 of the power takeoff shaft 7, the slit spring washer 9 crowds the lock ring 4 into the locking position because of a wedge action.

A dowel pin 16, shown in FIG. 3, serves as a safety antirotation device for the slit spring washer 9. The dowel pin 16, as best seen in FIG. 3, is arranged on the coupling sleeve 1 in such a way that it will engage within the slit 14 in every axial position of the slit spring washer 9. Thus, as the slit spring washer 9 moves between the position shown in FIG. 1 and the position shown in FIG. 2, the pin 16 will remain within the range of the slit 14, thereby preventing rotation of the washer 9.

Thus, it will be seen from the present invention that there is provided a coupling assembly, including a safety lock mechanism which is arrestable or latchable in the open or unlocked position and which may be constructed with an extremely short axial length.

In accordance with the invention, the principal features thereof are achieved in that a spring washer 9 exhibiting a slit 14 and provided with a conical surface 17, which widens outwardly, is arranged at the gripping sleeve 3 at least at the side facing the locking members 5, and that the slit spring washer 9 is equipped with a cylindrical inner bore 19 with the coupling sleeve 1 being equipped with a complementary conical surface 12 and a cylindrical seat 13 arranged in the area of the aperture 6 originating from an outer cylindrical area 11 arranged at the slip-on side. The locking members 5 are equipped in the area of the cylindrical seat 13 with a control face forming an angle $\alpha$ with the longitudinal axis of the coupling assembly, which angle opens counter to the slip-on direction and a dowel pin 16 is arranged at the coupling sleeve 1 in such a way that it engages into the slit 14 of the spring washer 9 over the entire length of axial travel of the spring washer 9.

In accordance with the invention, certain advantages are derived in that the slip spring washer 9 holds the lock ring 4 in the locked position by means of its radially acting spring force and that the spring washer, at the same time, assumes the retaining function in the arrested or latched open position of the assembly until it is released by the run-up action of the control faces, shown in FIG. 2, of the locking members because of the sliding in of the power takeoff shaft into the coupling sleeve.

While a specific embodiment of the invention has been shown and described in detail to illustrate the application of the inventive principles, it will be understood that the invention may be embodied otherwise without departing from such principles.

What is claimed is:

1. A coupling assembly including a lock latchable in the unlocked position particularly for connecting a universal shaft for driving an agricultural implement with a power takeoff shaft of a tractor comprising:
   a coupling sleeve having an axial bore defined therein adapted to receive in torque transmitting engagement a power takeoff shaft having an annular grove formed therein;
   radial apertures defined in said coupling sleeve;
   locking members received in said radial apertures for engaging in an annular groove formed in a power takeoff shaft received in said axial bore for effecting locked engagement between said power takeoff shaft and said coupling sleeve;
   said coupling sleeve being adapted to be brought into locked engagement with a power takeoff shaft by movement relative thereto in a slip-on direction and to be brought into an unlocked position by movement in an opposite direction;
   a lock ring engaging about said locking members to hold said coupling assembly in locked engagement;
   a gripping sleeve connected with said lock ring;
   a resilient spring washer having an axial slit formed therein enabling said spring washer to expand and contract radially;
   a first conical face formed on the side of said spring washer mating with a first complementary conical face formed on said gripping sleeve;
   a second conical face on said spring washer on the side thereof opposite said first conical face mating with a second complementary conical face formed on said coupling sleeve;
   a cylindrical seating face formed on said coupling sleeve adjacent said second complementary conical face; and
   a cylindrical inner bore formed on said spring washer adapted to seat on said cylindrical seating face when said washer is radially expanded by being urged by said gripping sleeve against said second complementary conical face to place said coupling assembly in an arrested unlocked position.

2. An assembly according to claim 1, wherein in the area of said cylindrical seating face, said locking members are formed with a control face extending at an oblique angle relative to a longitudinal axis of said coupling assembly, said angle widening taken in a direction counter to said slip-on direction.

3. An assembly according to claim 1, further comprising a pin arranged on said coupling sleeve to extend within said axial slit of said resilient spring washer, said pin being positioned so as to remain in engagement within said slit over the entire axial length of travel of said spring washer.

4. An assembly according to claim 1, wherein said first and second conical faces on said resilient spring washer extend at angles diverging away from each other taken in a direction radially outwardly of said assembly.

* * * * *